United States Patent
Klyza et al.

(10) Patent No.: US 10,066,545 B2
(45) Date of Patent: Sep. 4, 2018

(54) FUEL INJECTION STRATEGIES IN OPPOSED-PISTON ENGINES WITH MULTIPLE FUEL INJECTORS

(71) Applicant: ACHATES POWER, INC., San Diego, CA (US)

(72) Inventors: Clark A. Klyza, San Diego, CA (US); Fabien G. Redon, San Diego, CA (US)

(73) Assignee: ACHATES POWER, INC., San Diego, CA (US)

( * ) Notice: Subject to any disclaimer, the term of this patent is extended or adjusted under 35 U.S.C. 154(b) by 0 days.

(21) Appl. No.: 15/472,002

(22) Filed: Mar. 28, 2017

(65) Prior Publication Data

US 2017/0198632 A1    Jul. 13, 2017

Related U.S. Application Data

(63) Continuation of application No. 13/654,340, filed on Oct. 17, 2012, now abandoned.

(Continued)

(51) Int. Cl.
*F02B 75/28*    (2006.01)
*F02D 41/40*    (2006.01)
(Continued)

(52) U.S. Cl.
CPC ........ *F02B 75/282* (2013.01); *F02D 41/3094* (2013.01); *F02D 41/402* (2013.01); *F02D 41/403* (2013.01); *F02D 41/405* (2013.01); *F02M 55/025* (2013.01); *F02M 69/04* (2013.01); *F02M 69/045* (2013.01); *F02M 69/10* (2013.01); *F02M 69/465* (2013.01); *Y02T 10/44* (2013.01)

(58) Field of Classification Search
CPC ................ F02B 23/0663; F02B 23/104; F02B 2275/14; F02B 25/08; F02B 75/28; F02B 75/282; F02D 41/3094; F02D 41/402; F02D 41/403; F02D 41/405; F02M 69/04; F02M 69/045
See application file for complete search history.

(56) References Cited

U.S. PATENT DOCUMENTS 1,127,772 A * 2/1915 Junkers .................... 123/299
1,207,799 A * 12/1916 Scheller .................... 123/281
(Continued)

FOREIGN PATENT DOCUMENTS

BE        388676        5/1932
CN    101151444 A    3/2008
(Continued)

OTHER PUBLICATIONS

Hirsch, N.R., et al., SAE Publication 2006-01-0926, "Advanced Opposed Piston Two-Stroke Diesel Demonstrator," Apr. 2006.*
(Continued)

*Primary Examiner* — John Zaleskas
(74) *Attorney, Agent, or Firm* — Terrance A. Meador

(57) ABSTRACT

In an opposed-piston engine, two or more fuel injectors are mounted to a cylinder for direct side injection into the cylinder. The injectors are controlled so as to inject either a single fuel pulse or a plurality of fuel pulses per cycle of engine operation in order to initiate combustion during varying engine speeds and operating conditions.

9 Claims, 5 Drawing Sheets

Related U.S. Application Data

(60) Provisional application No. 61/628,248, filed on Oct. 27, 2011.

(51) Int. Cl.

| | | |
|---|---|---|
| F02M 55/02 | (2006.01) | |
| F02M 69/04 | (2006.01) | |
| F02D 41/30 | (2006.01) | |
| F02M 69/10 | (2006.01) | |
| F02M 69/46 | (2006.01) | |

(56) References Cited

U.S. PATENT DOCUMENTS

| | | | | |
|---|---|---|---|---|
| 1,464,268 | A * | 8/1923 | Keller | F02B 25/00 123/299 |
| 1,523,453 | A | 1/1925 | Scott | 123/51 B |
| 2,132,083 | A * | 10/1938 | Pateras Pescara | F02B 71/00 123/275 |
| 2,173,081 | A * | 9/1939 | Barkeij | F02B 9/00 123/275 |
| 2,463,418 | A * | 3/1949 | Pateras Pescara | F02B 3/02 123/262 |
| 2,682,862 | A | 7/1954 | Camnar | 123/276 |
| 2,767,691 | A * | 10/1956 | Mengelkamp | F02B 7/00 123/1 A |
| 3,411,289 | A | 11/1968 | Antonsen et al. | 60/13 |
| 4,257,365 | A * | 3/1981 | Noguchi | F02B 25/08 123/51 B |
| 4,872,433 | A * | 10/1989 | Paul | F02B 23/02 123/257 |
| 5,042,441 | A * | 8/1991 | Paul | F01B 7/14 123/257 |
| 5,058,537 | A * | 10/1991 | Paul | F01B 7/14 123/193.6 |
| 5,083,530 | A | 1/1992 | Rassey | 123/51 R |
| 5,261,359 | A | 11/1993 | Hall | 123/65 V |
| 5,582,152 | A | 12/1996 | Drutel et al. | 123/436 |
| 5,960,672 | A | 10/1999 | Pritschow et al. | 74/490.07 |
| 6,073,608 | A | 6/2000 | Krieger et al. | 123/299 |
| 6,161,518 | A | 12/2000 | Nakakita et al. | 123/298 |
| 6,170,443 | B1 | 1/2001 | Hofbauer | 123/51 B |
| 6,182,619 | B1 * | 2/2001 | Spitzer | F02B 25/08 123/51 B |
| 6,345,601 | B1 | 2/2002 | Miyajima et al. | 123/305 |
| 6,378,487 | B1 * | 4/2002 | Zukouski | F02B 3/10 123/295 |
| 6,418,885 | B1 * | 7/2002 | Paul | F02D 19/081 123/25 C |
| 6,491,016 | B1 * | 12/2002 | Buratti | F02D 41/3827 123/299 |
| 6,854,440 | B2 | 2/2005 | Cathcart et al. | 123/298 |
| 6,874,489 | B2 | 4/2005 | Yonekawa et al. | 123/661 |
| 6,928,997 | B2 | 8/2005 | Yu | 123/657 |
| 6,997,158 | B1 | 2/2006 | Liu | 123/279 |
| 7,210,448 | B2 | 5/2007 | Stanton et al. | 123/298 |
| 7,270,108 | B2 * | 9/2007 | Lemke | F02B 7/02 123/299 |
| 7,438,039 | B2 | 10/2008 | Poola et al. | 123/193.6 |
| 7,597,084 | B2 | 10/2009 | Vachon et al. | 123/294 |
| 8,402,940 | B2 | 3/2013 | Straub | 123/301 |
| 8,783,218 | B2 | 7/2014 | Shen | 123/51 R |
| 2004/0103874 | A1 * | 6/2004 | Takahashi | F02D 41/403 123/299 |
| 2005/0066929 | A1 | 3/2005 | Liu | 123/193.4 |
| 2005/0150478 | A1 | 7/2005 | Nomura | 123/305 |
| 2005/0224605 | A1 * | 10/2005 | Dingle | F02B 19/14 239/533.2 |
| 2005/0224606 | A1 * | 10/2005 | Dingle | F02B 19/14 239/533.2 |
| 2005/0274332 | A1 * | 12/2005 | Lemke | F02B 75/28 123/41.35 |
| 2006/0124084 | A1 | 6/2006 | Hofbauer et al. | 123/55.7 |
| 2006/0157003 | A1 * | 7/2006 | Lemke | F02B 75/28 123/41.38 |
| 2006/0219213 | A1 * | 10/2006 | Lemke | F02B 7/02 123/299 |
| 2007/0272191 | A1 | 11/2007 | Tsujimoto et al. | 123/193.5 |
| 2008/0006238 | A1 | 1/2008 | Hofbauer et al. | 123/208 |
| 2008/0115771 | A1 | 5/2008 | Elsbett | 123/51 BA |
| 2008/0127947 | A1 | 6/2008 | Hofbauer et al. | 123/51 R |
| 2008/0264149 | A1 * | 10/2008 | Hazelton | F02D 41/2432 73/35.06 |
| 2009/0139485 | A1 | 6/2009 | Pontoppidan | 123/305 |
| 2009/0159022 | A1 | 6/2009 | Chu | 123/52.2 |
| 2010/0006061 | A1 | 1/2010 | Shibata et al. | 123/307 |
| 2010/0107868 | A1 | 5/2010 | Scharp et al. | 92/159 |
| 2010/0108044 | A1 | 5/2010 | Liu | 123/664 |
| 2010/0224162 | A1 | 9/2010 | Hofbauer | 123/196 R |
| 2010/0282219 | A1 * | 11/2010 | Alonso | F01B 3/10 123/51 AA |
| 2011/0041684 | A1 | 2/2011 | Kortas et al. | 92/255 |
| 2011/0041799 | A1 * | 2/2011 | Cleeves | F02B 1/02 123/307 |
| 2011/0239982 | A1 * | 10/2011 | Straub | F02B 23/0624 123/306 |
| 2011/0271932 | A1 | 11/2011 | Fuqua et al. | 123/301 |
| 2012/0073526 | A1 | 3/2012 | Dion et al. | 123/41.44 |
| 2012/0073541 | A1 | 3/2012 | Fuqua et al. | 123/301 |
| 2012/0234285 | A1 | 9/2012 | Venugopal et al. | 123/193.6 |
| 2012/0285418 | A1 * | 11/2012 | Elsbett | F01B 7/14 123/300 |
| 2013/0014718 | A1 * | 1/2013 | Shen | F02B 23/0675 123/18 A |
| 2013/0104848 | A1 | 5/2013 | Klyza et al. | 123/445 |

FOREIGN PATENT DOCUMENTS

| | | | |
|---|---|---|---|
| DE | 4335515 | A1 | 4/1995 |
| DE | 19651175 | A1 | 6/1998 |
| DE | 10141888 | A1 | 4/2003 |
| DE | 102004010361 | A1 | 12/2004 |
| DE | 102006055251 | A1 | 5/2008 |
| DE | 102008055911 | A1 | 5/2010 |
| FR | 848994 | | 6/1939 |
| GB | 531366 | | 1/1941 |
| GB | 562343 | | 6/1944 |
| JP | 1996-042383 | | 2/1996 |
| JP | 1999-200933 | | 7/1999 |
| JP | 2000-08929 | A | 1/2000 |
| JP | 2000008929 | A * | 1/2000 ......... F02D 41/3035 |
| JP | 2003-097328 | | 4/2003 |
| JP | 2005-163639 | | 6/2005 |
| JP | 2006-152952 | | 6/2006 |
| JP | 2006-194190 | | 7/2006 |
| JP | 2008-032029 | | 2/2008 |
| JP | 2008-534857 | | 8/2008 |
| JP | 2009-138718 | | 6/2009 |
| JP | 2011-122465 | | 6/2011 |
| SU | 1216394 | A1 | 3/1986 |
| WO | WO-01/25618 | A1 | 4/2001 |
| WO | WO-2006/105390 | A1 | 10/2006 |
| WO | WO-2007/006469 | A2 | 1/2007 |
| WO | WO-2009/061873 | A1 | 5/2009 |
| WO | WO-2011/061191 | A1 | 5/2011 |
| WO | WO-2013/062921 | A1 | 5/2013 |

OTHER PUBLICATIONS

English translation of Notification of Reasons of Refusal dated Jan. 17, 2017, issued by the Japan Patent Office, for Japanese Patent Application No. 2014-538868.

English translation of Notification of Reasons of Refusal dated May 31, 2016, issued by the Japan Patent Office, for Japanese Patent Application No. 2014-538868.

English translation of Notification of First Office Action dated Feb. 1, 2016, issued by the State Intellectual Property of China, for Chinese Patent Application No. 2012800525653.

(56) References Cited

OTHER PUBLICATIONS

English translation of Notification of Allowance for Invention Patent dated Nov. 7, 2016, issued by the State Intellectual Property of China, for Chinese Patent Application No. 2012800525653.
Communication pursuant to Article 94(3) EPC dated Feb. 3, 2017, for European patent Application No. 12806198.3.
Franke, M., *SAE Publication 2006-01-0277*, "Opposed Piston Opposed Cylinder (opoc) 450 Engine: Performance Development by CAE Simulations and Testing," M. Franke, et al, Apr. 2006.
Hirsch, et al., "Advanced Opposed-Piston Two-Stroke Diesel Demonstrator", SAE Publication 2006-01-0926, published Apr. 3, 2006.
Hofbauer, P., *SAE Publication 2005-01-1548*, "Opposed Piston Opposed Cylinder (opoc) Engine for Military Ground Vehicles," Apr. 2005.
International Search Report/Written Opinion for PCT/ US2011/000692, dated Aug. 18, 2011.
International Search Report/Written Opinion for PCT/ US2011/001436, dated Nov. 3, 2011.
International Search Report/Written Opinion for PCT/ US2012/038061, dated May 16, 2012.
International Search Report/Written Opinion for PCT/ US2011/061381, dated Apr. 12, 2013.
Pirault, J-P., et al, *Opposed Piston Engines: Evolution, Use, and Future Applications*, 2010, pp. 231-245.
Communication pursuant to Article 94(3) EPC dated Sep. 20, 2017, for European patent application No. 12806198.3.
Hirsch, et al., "Advanced Opposed-Piston Two-Stroke Diesel Demonstrator", SAE Publication 2006-01-0926.

\* cited by examiner

FUEL INJECTION STRATEGIES IN OPPOSED-PISTON ENGINES WITH MULTIPLE FUEL INJECTORS

PRIORITY

This application is a continuation of co-pending U.S. patent application Ser. No. 13/654,340, filed Oct. 17, 2012, for "Fuel Injection Strategies in Opposed-Piston Engines with Multiple Fuel Injectors," which claims the benefit of U.S. provisional application for patent No. 61/628,248, filed Oct. 27, 2011, for "Fuel Injection Strategies in Opposed-Piston Engines with Multiple Fuel Injectors".

BACKGROUND

The present disclosure relates to fuel injection strategies for opposed-piston engines with direct side injection. In particular, the present disclosure concerns fuel injection in opposed-piston cylinders equipped with multiple injectors.

Efficient combustion is a fundamental challenge inherent in diesel engine operation. This challenge is typically addressed in conventional diesel engines by injecting fuel from a central location on the fire deck directly into an appropriately shaped combustion chamber defined between the end surface of the piston and the fire deck.

In opposed-piston architecture, two pistons are disposed crown to crown in a cylinder where they move in opposition between top dead center (TDC) and bottom dead center (BDC) positions. The combustion chamber is defined in the cylinder, between the end surfaces of the pistons as they approach TDC. Consequently, it is not possible to mount a fuel injector in a central position facing the end surface of a piston in an opposed-piston engine. Instead, a fuel injector mounting site is typically located on the sidewall of the cylinder, between the TDC locations of the piston end surfaces. This results in the direct side injection configuration that is characteristic of opposed-piston engine design. That is to say, fuel is injected directly into the combustion chamber, through the sidewall of the cylinder.

A problem with direct side injection is that the injected fuel travels radially or tangentially into the cylinder, transversely to the axis of charge air swirl, which can inhibit air/fuel mixing and result in incomplete and/or uneven combustion. Accordingly, it is desirable to improve the fuel injection capabilities of opposed-piston engines with direct side injection.

SUMMARY

In one aspect, the present disclosure is directed to a fuel injection method and system for improved direct side injection in an opposed-piston engine so as to enhance air/fuel mixing and improve combustion.

In another aspect, the present disclosure is directed to an opposed-piston engine including at least one cylinder equipped with two or more fuel injectors for direct side injection into the cylinder. Each of the injectors is controlled so as to inject either a single fuel pulse or a plurality of fuel pulses per cycle of engine operation in response to varying engine speeds and operating conditions.

In a further aspect, the present disclosure relates to injecting fuel from first and second fuel injectors into a combustion chamber of an opposed-piston engine defined between the end surfaces of opposed pistons as the pistons approach top dead center locations, such that fuel injected by the first fuel injector includes at least a pilot injection followed by a main injection, and fuel injected by the second fuel injector includes at least a pilot injection followed by a main injection.

DETAILED DESCRIPTION

Figure 1:
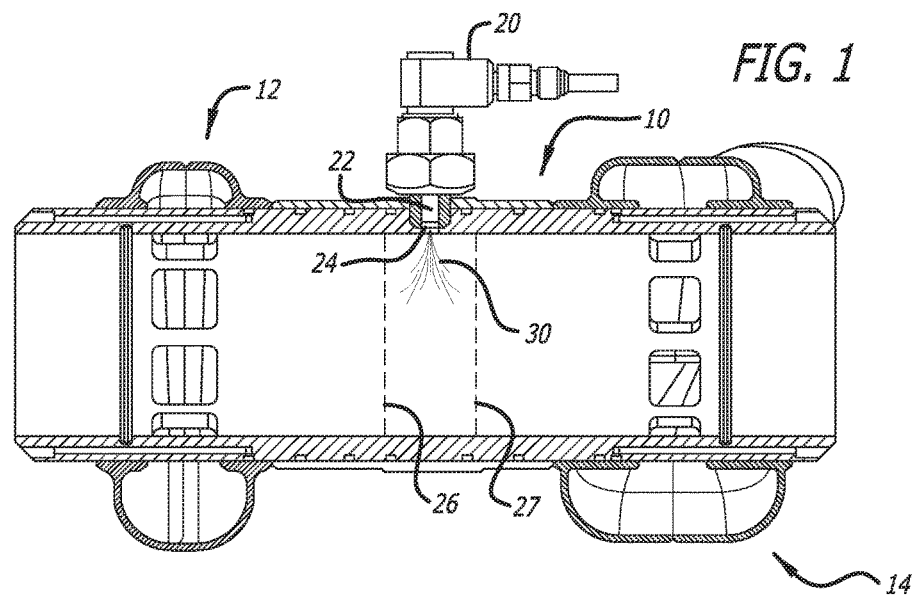
FIG. 1 is a cross sectional view of an opposed-piston engine cylinder with a single fuel injector mounted for direct side injection into cylinder bore space between the end surfaces of a pair of opposed pistons.

FIG. 1 illustrates a cylinder for an opposed-piston engine, with the cylinder shown in cross section. The cylinder 10 has exhaust and intake ports 12 and 14 located in the vicinity of respective ends of the cylinder. An electrically-actuated fuel injector 20 has a nozzle 22 seated in a hole 24 drilled through the sidewall of the cylinder 10. The hole 24 is located between bore locations 26 and 27 corresponding to respective TDC positions of the end surfaces of a pair of opposed pistons (not shown) disposed in the cylinder bore. When the pistons are at or near their TDC positions, the fuel injector 20 is operated to inject a spray of fuel 30 into the cylinder bore space between the piston end surfaces.

Figure 2:
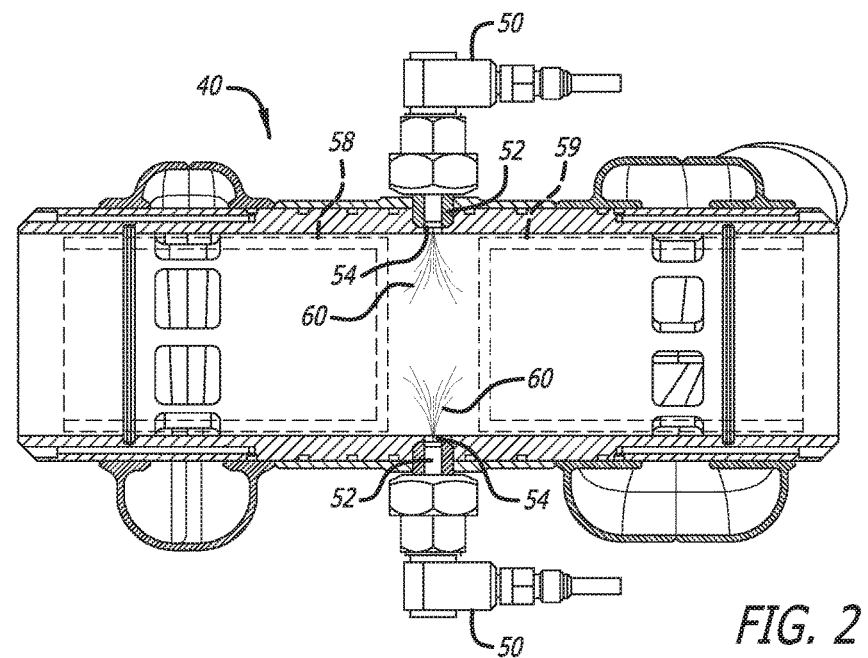
FIG. 2 is a cross sectional view of an opposed-piston engine cylinder with multiple fuel injectors mounted for direct side injection into cylinder bore space between the end surfaces of a pair of opposed pistons.

FIG. 2 is a cross sectional view of an opposed-piston engine cylinder 40 with multiple electrically-actuated fuel injectors 50 mounted for direct side injection into cylinder bore space between the end surfaces of a pair of opposed pistons. Each fuel injector 50 has a nozzle 52 seated in a hole 54 drilled through the sidewall of the cylinder 50. The holes 54 are located between bore locations corresponding to respective TDC positions of the end surfaces of the pair of opposed pistons 58 and 59 disposed in the cylinder bore. As the pistons 58 and 59 move toward TDC, turbulently-moving charge air is compressed between their end surfaces. When the pistons 58 and 59 are at or near TDC, one or each of the fuel injectors 50 is operated to inject a respective spray of fuel 60 into compressed charge in the cylinder bore space between the piston end surfaces. The fuel is mixed into the compressed, turbulent charge air and the heat produced by compression causes the air/fuel mixture to ignite.

Figure 3:
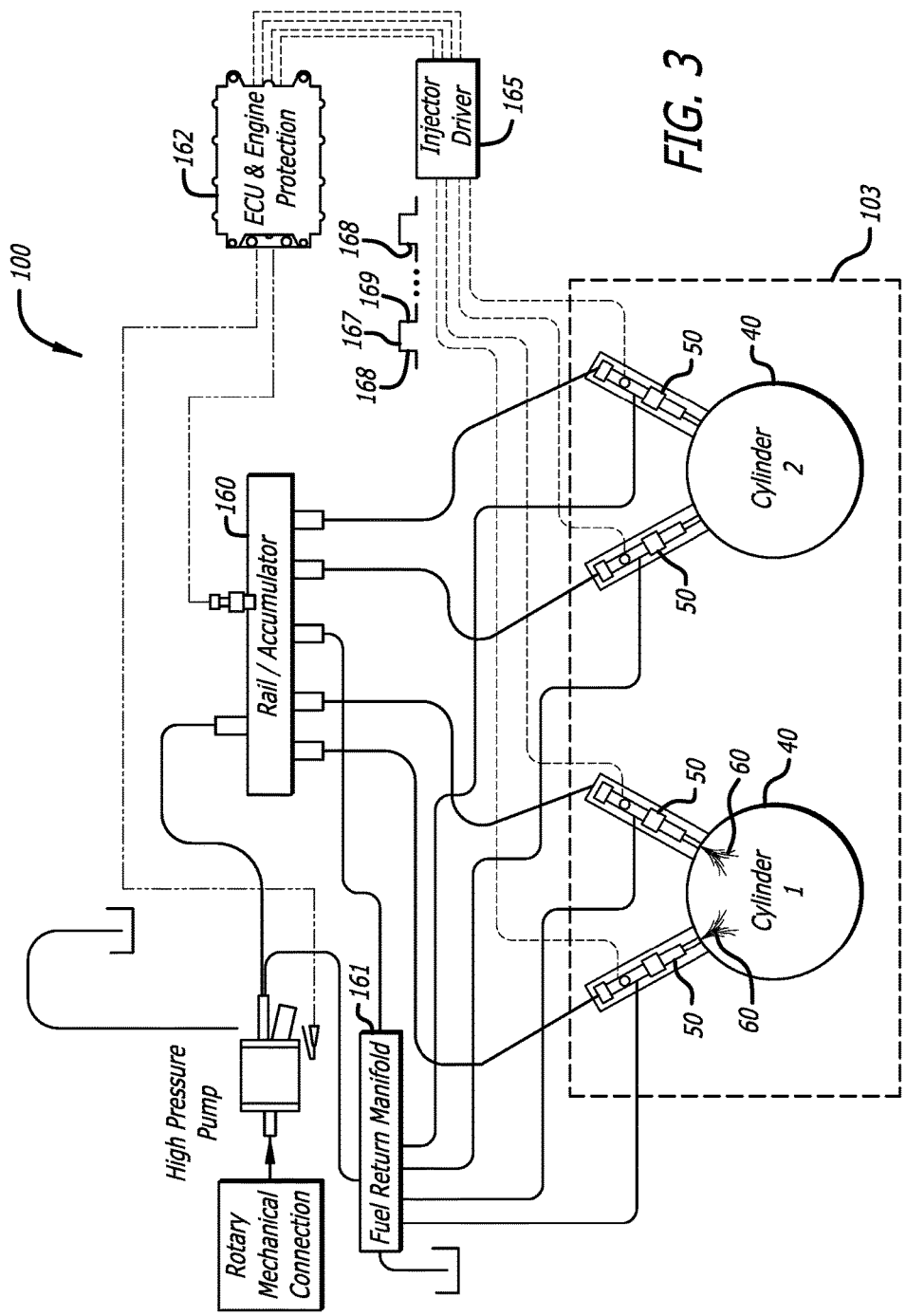
FIG. 3 is a schematic diagram of a preferred fuel injection system for an opposed-piston engine.

A fuel injection system for an opposed-piston engine is shown in schematic diagram form in FIG. 3. The fuel injection system 100 includes an opposed-piston engine 103 having one or more cylinders. Each cylinder has a construction corresponding to that of the cylinder 40 of FIG. 2; thus, each cylinder 40 has a pair of opposed pistons (not shown) disposed for opposed movement therein and multiple fuel injectors 50 between the TDC locations of the pistons. For example, each cylinder has two fuel injectors 50. Preferably, fuel is fed to the fuel injectors 50 from a fuel source 160 that includes a rail/accumulator mechanism to which fuel is pumped from a reservoir. A fuel return manifold 161 collects fuel from the fuel injectors 50 and the fuel source for return to the reservoir.

An engine control unit (ECU) 162 receives data from a variety of sensors (not shown) that measure parameter values related to operating conditions of the engine, the transmission, and so on. The ECU 162 includes a fuel injection control mechanization that implements fuel injection control procedures in response to measured parameter values obtained from the sensors. These control procedures cause the generation of output control signals that are coupled to an electronic multichannel injector driver 165. In response to the control signals, the injector driver 165 generates drive signals on separate dedicated channels to operate the fuel injectors 50. In other words, the injector driver 165 electronically enables the operation of each fuel injector 50 independently of every other fuel injector 50.

Preferably, each fuel injector 50 includes or is associated with an electrically-operated actuator (such as a solenoid) that operates the injector. Preferably, the actuator is controlled by respective drive signals produced by the injector driver 165. A representative drive signal is illustrated by a pulse-width modulated (PWM) waveform 167, for example. Each such waveform has a first edge 168 that sets an actuator to a first state and a second edge 169 that resets the actuator from the first to a second state. Preferably, the first state opens the nozzle of the fuel injector 50, initiating emission of a pulse of fuel 60 (also called "an injection") into the cylinder 40; while the second state closes the nozzle of the fuel injector 50, terminating the injection. Alternatively, the fuel injection system 100 may be equipped to respond to other types and/or shapes of drive signals.

Presuming that pulse-width modulated waveforms are used to operate the fuel injectors 50, the duration of any one injection emitted by a fuel injector corresponds to the width of the drive pulse: a narrow pulse produces an injection of short duration; a wide pulse produces an injection of longer duration. The fuel injection system 100 is designed to operate each injector in a plurality of fuel injection modes that include one or more injections. In a first mode of operation, a fuel injector emits a single injection into a combustion chamber in order to initiate combustion. In a second mode of operation, called a "split injection", a fuel injector emits two or more injections into a combustion chamber to initiate combustion: at least one first, relatively narrow, injection (called a "pilot' injection) is followed by a second, relatively longer, injection (called a "main injection"). The pilot and main injections are separated by a time interval. In order to produce split injections with well-defined shapes and precisely-timed durations, the operations of the fuel injection system 100 are also designed to observe a minimum time interval (called "an inter-pulse gap" or IPG) measured between successive edges of successive drive signal pulses. Failure to adhere to the inter-pulse gap can result in overlapping injections or variability in the quantity of fuel injected.

The fuel injection system 100 is further designed to transition from single to split injection, and from split to single injection, as required by engine operating conditions. Further, with multiple independently-controlled fuel injectors for each cylinder, the design of the fuel injection system 100 enables transition from operating a single fuel injector per cylinder to operating a plurality of fuel injectors per cylinder, and from operating a plurality of fuel injectors per cylinder to operating a single fuel injector per cylinder, as required by engine operating conditions.

Figure 4:
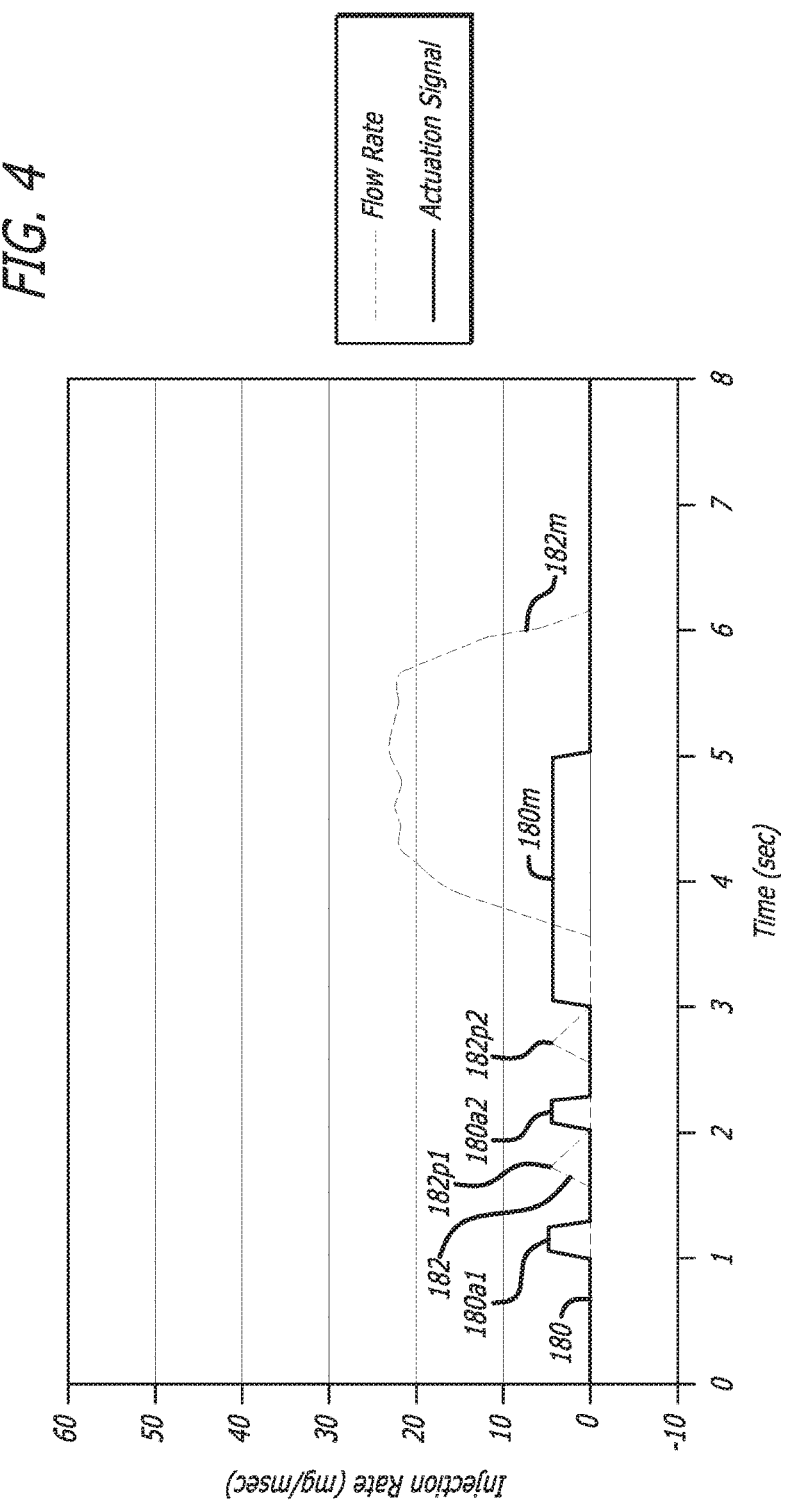
FIG. 4 is a graph showing injector actuation and injection rates for the single fuel injector construction of FIG. 1.

Fuel Injection with a Single Injector Per Cylinder:

With reference to FIGS. 1 and 4, an opposed-piston engine in which each cylinder has only a single fuel injector is constrained in that a certain orifice area is necessary in order to introduce a fuel charge in a given number of crank angle degrees at a particular engine speed. This limitation can be detrimental to spray quality and may adversely limit minimum pilot fuel available. Further, a single injector actuated by a solenoid has limitations in that an IPG must be observed in order to assure the previous injection has completed and residual magnetism in the solenoid has decayed. A single injector actuation (drive) signal curve 180 and fuel injection rate curve 182 are shown in FIG. 4. The graph shows a split injection including two pilot injections 182p1, 182p2, and a main injection 182m. A first actuation pulse 180a1 starts at 1 millisecond (msec) and is followed by pilot injection 182p1 approximately 0.5 msec later. Following the end of the first pilot injection 182p1, a second actuation pulse 180a2 starts at 2 msec. The rising edge of the second actuation pulse 180a2 occurs about 0.75 msec after the falling edge of the first actuation pulse 180a1. Presume that 0.75 msec is the IPG. If the IPG is disregarded and the second actuation pulse 180a2 starts prior to the end of the first injection 182p1, then the quantity of injected fuel and timing of the second pilot injection 182p2 can deviate from intended values. This is due to reduced injection response time on the second pilot injection 182p2 resulting in errors in both timing and quantity. Manifestly the minimum interval imposed by the IPG limits the number of injections that can be applied in a given crank angle by a single injector.

Figure 5:
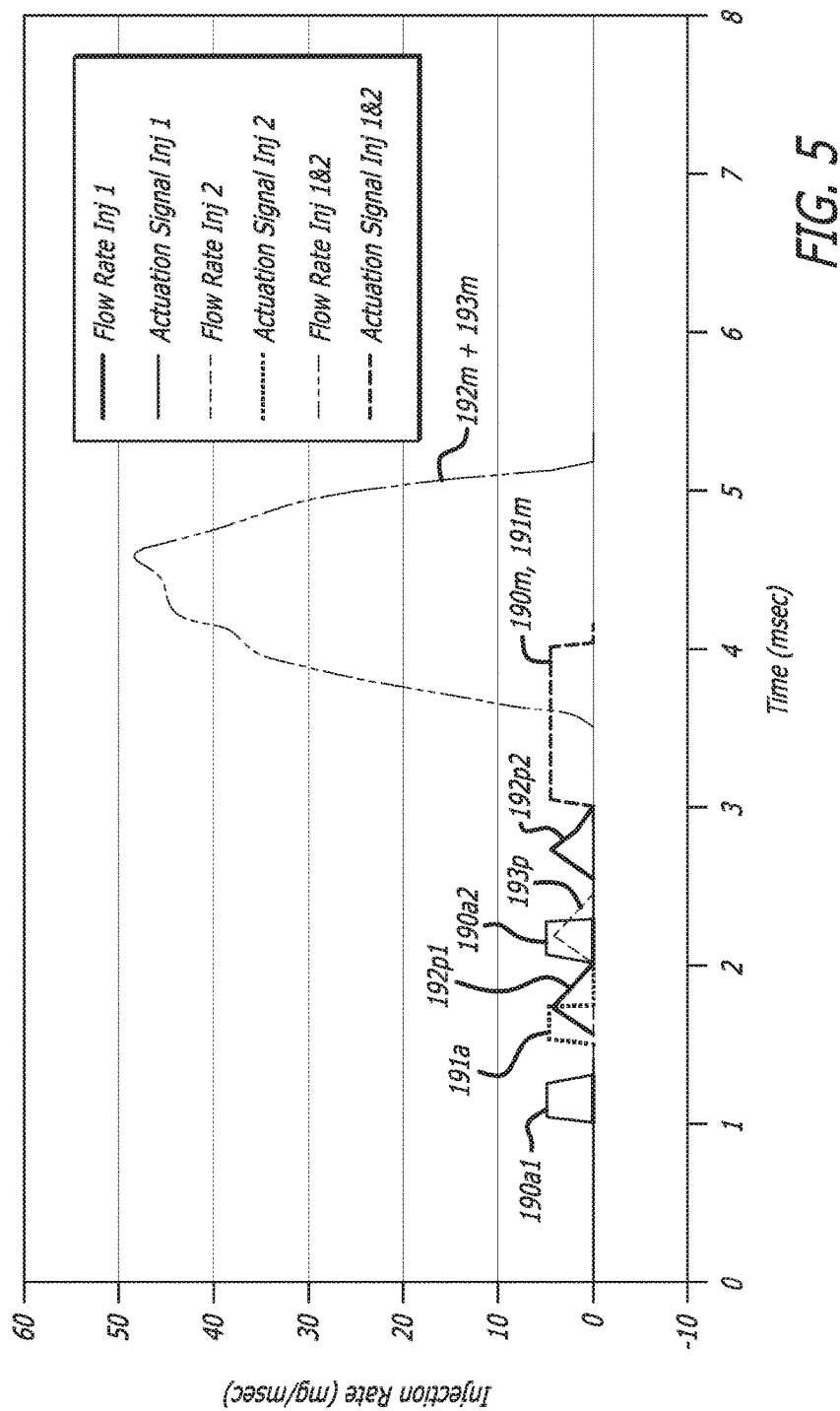
FIG. 5 is a graph showing injector actuations and injection rates embodying a first control strategy for the multiple fuel injector construction of FIG. 2.

Fuel Injection with Multiple Injectors Per Cylinder:

With reference to FIGS. 2 and 5, an opposed-piston engine includes at least one cylinder equipped with multiple injectors actuated sequentially and/or simultaneously. For example, as per FIG. 5, two fuel injectors 50 are operated according to the actuation and injection curves shown in FIG. 5. There are three pilot injections shown, two (192p1 and 192p2) from a first of the fuel injectors 50, and one (193p) from the second fuel injector. Presume that the two actuation pulses 190a1 and 190a2 that cause the two pilot injections 192p1 and 192p2 are subject to the same IPG as the fuel injector of FIG. 1 (0.75 msec). The actuation pulse 191a causes the third pilot injection 193p to occur between the two pilot injections 190a1 and 190a2, thus providing three tightly-grouped pilot injections occurring in the time a single injector can provide a maximum of two pilot injections. This results in a maximum number of injections, $N_{max}$, in a given time. For example, using two injectors $N_{max}$ is given by: $N_{max} = N_{1\ max} + (N_{1max} - 1)$, where $N_{1\ max}$ is the maximum number of injections from one fuel injector, under the constraint of a minimum interval. With additional injectors and overlapping injections provided by multiple fuel injectors, greater numbers of injections can be achieved in a given time than can be with a single fuel injector. Because the fuel injectors are disposed at different circumferential positions on the periphery of the cylinder, they inject into different regions of the combustion chamber, and available air is not an issue with this method. The main injections 192m+193m produce an aggregate main injection as shown in FIG. 5 that results in substantially simultaneous actuation of both injectors 50, as indicated by the alignment of the two main actuation pulses 190m and 191m. This doubles the rate of injection into the combustion chamber and cuts the duration of the aggregated main injection in half.

Figure 6:
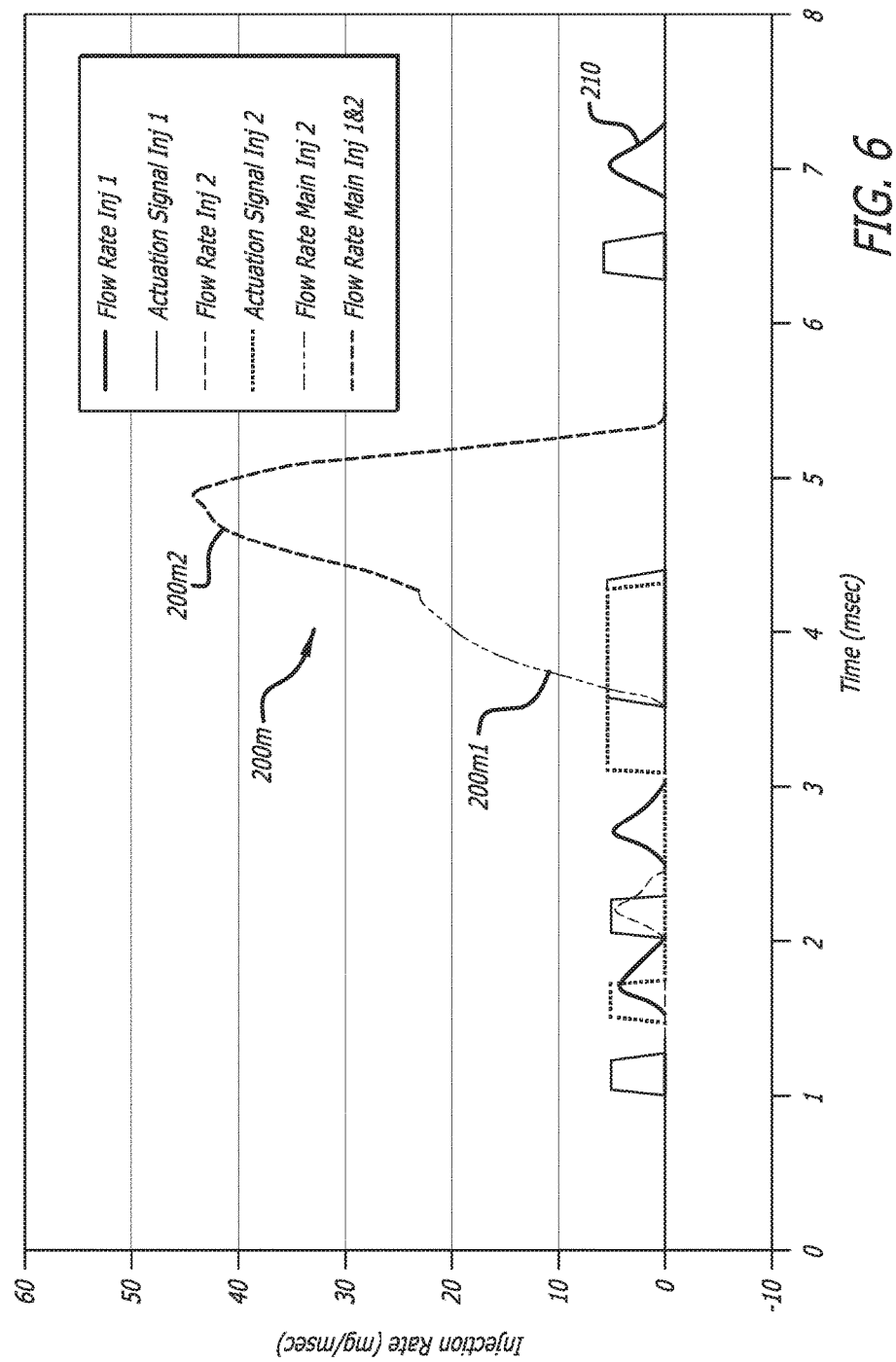
FIG. 6 is a graph showing injector actuations and injection rates embodying a second control strategy for the multiple fuel injector construction of FIG. 2.

An example of using multiple injectors in order to rate-shape the injected quantity of an aggregated main injection is shown in FIG. 6. As in FIG. 5, injection includes staggered split injections from two fuel injectors that results in three tightly grouped pilot injections. The group of pilot injections is followed by a rate-shaped aggregate main injection 200m. As shown, the second fuel injector is first actuated to create the first portion 200m1 of the main injection. After an appropriate delay, the first fuel injector is also actuated so that both fuel injectors introduce fuel simultaneously. As is evident in FIG. 6, fuel is injected at a first rate during the first portion 200m1, and the rate of injection increases in the second portion 200m2. The rate of injection is thereby "shaped". Relative shifts of the main actuation pulses and/or changes in their durations can produce different shapes in the aggregate main injection. The ability to rate-shape reduces pre-mixed spikes and allows for much smoother combustion and reduced emissions.

In FIG. 6, a post injection 210 is shown following the aggregate main injection 200m. The post injection 210 can be produced by actuating the first injector alone, thus providing a minimal fuel charge for the post injection. If desired, multiple post injections can be applied by multiple actuations of either injector or by sequential actuation of both injectors similar to that described for the grouped pilot injections.

As should be evident, direct side injection in an opposed-piston engine having a plurality of electronically-controlled fuel injectors located in the same cylinder allows for multiple degrees of freedom not available with a single fuel injector. Injections can be simultaneous, sequential or staggered thus affording very closely spaced injections and rate shaping. These extra degrees of freedom offer enhanced performance and emission possibilities. Using multiple fuel injectors allows for the injector nozzle holes to be optimally sized with respect to spray characteristics while at the same time providing the flexibility of being able to increase the number of holes available to allow for rapid introduction of the fuel charge. Conversely, independently controlled fuel injectors allow for decreasing the number of holes at low fuel demand in order to lengthen injection time and to smooth combustion. Having the ability to actuate a single injector or multiple injectors in a given cycle allows the use of higher rail pressure at lower quantities, providing superior spray quality in comparison to that available from a single injector having high flow properties. Furthermore, by actuating multiple injectors sequentially at various positions around the periphery it is possible to have many injections of varying or similar quantity introduced into the cylinder at various locations and with full authority regarding the timing of said injections.

Although fuel injection strategies for opposed-piston engines have described with reference to representative embodiments, it should be understood that various modifications can be made without departing from the underlying principles. Accordingly, the patent protection to be afforded these strategies is limited only by the following claims.

The invention claimed is:

1. A method of operating an opposed-piston engine with fuel injectors located for direct side injection of fuel into a cylinder of the opposed-piston engine, in which a pair of pistons is disposed crown to crown in the cylinder, the method comprising:
   causing the pair of opposed pistons to move in the cylinder;
   compressing charge air between end surfaces of the pair of opposed pistons as they move toward top dead center positions in the cylinder;
   injecting fuel from a first fuel injector and a second fuel injector in response to successive drive signal pulses;
   the fuel being injected into a combustion chamber defined in the cylinder between the end surfaces of the pair of opposed pistons as the pair of opposed pistons approach top dead center locations, such that fuel injected by the first fuel injector includes at least a pilot injection followed by a main injection, and fuel injected by the second fuel injector includes at least a pilot injection followed by a main injection;
   maintaining an inter-pulse gap between successive edges of the drive signal pulses that causes each pilot injection to be separated from its following main injection by at least a minimum time interval; and,
   causing the fuel to ignite in response to heat produced by compression of the charge air.

2. The method of claim 1, wherein the pilot injections injected by the first and second fuel injectors are offset by an amount of time less than the inter-pulse gap.

3. The method of claim 2, wherein the main injections injected by the first and second fuel injectors are substantially simultaneous.

4. The method of claim 1, wherein the fuel injected by the first fuel injector includes a second pilot injection delayed from the pilot injection by at least the inter-pulse gap, and the main injection is delayed from the second pilot injection.

5. The method of claim 4, wherein the pilot injection injected by the second fuel injector occurs in time between the pilot injection and the second pilot injection of the first fuel injector.

6. The method of claim 5, wherein the main injections of the first and second fuel injectors occur substantially simultaneously in time.

7. The method of claim 5, wherein the main injections of the first and second fuel injectors overlap in time.

8. The method of claim 1, wherein the fuel injected by the first fuel injector further includes at least one post injection following the main injection.

9. The method of claim 1, wherein the fuel injected by the second fuel injector further includes at least one post injection following the main injection.

* * * * *